Aug. 15, 1944.   G. C. QUICK   2,356,119
AIRPLANE INSECTICIDE DISSEMINATION APPARATUS
Filed Aug. 17, 1942
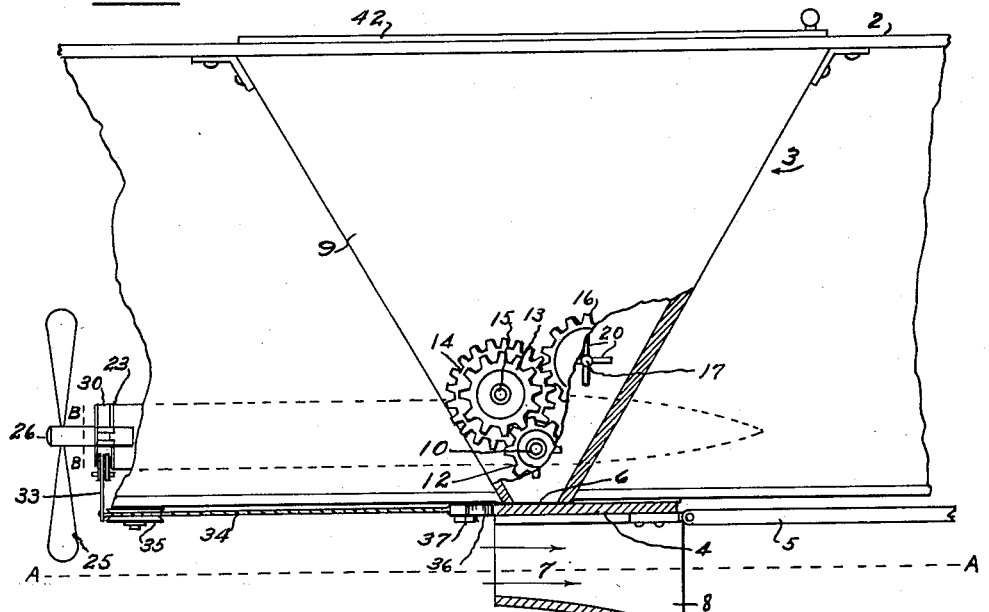
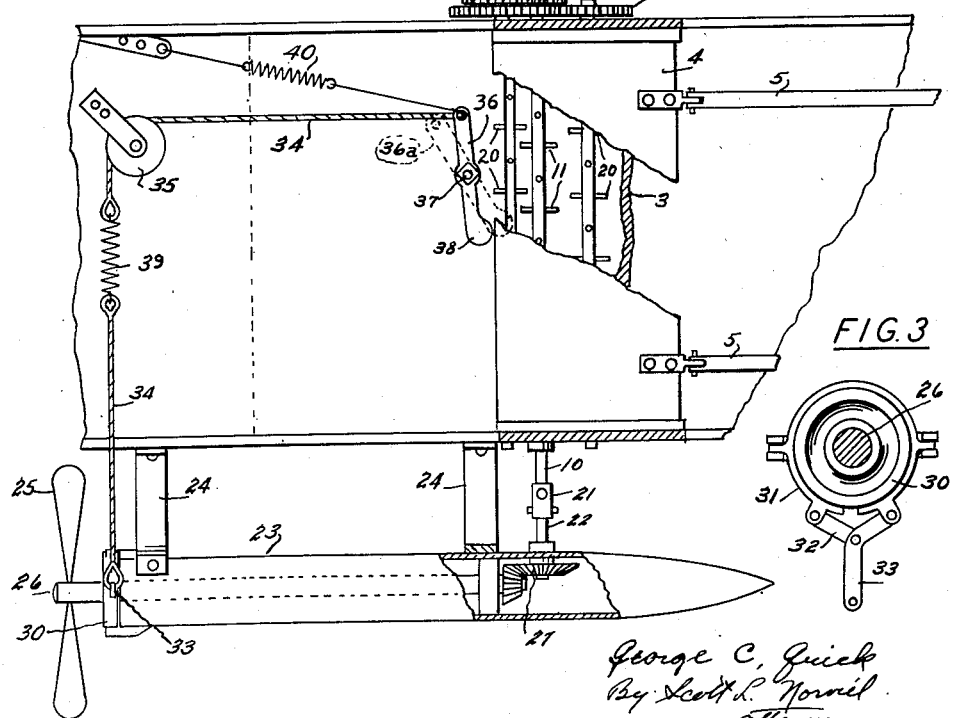

Patented Aug. 15, 1944

2,356,119

UNITED STATES PATENT OFFICE 2,356,119

AIRPLANE INSECTICIDE DISSEMINATION APPARATUS

George Curtis Quick, Phoenix, Ariz.

Application August 17, 1942, Serial No. 455,159

4 Claims. (Cl. 43—145)

This invention pertains to apparatus for effective and properly disseminating insecticide or other materials from airplanes and also applies to the art of crop dusting from airplanes as commonly known and practiced. Heretofore, the art has been developed to the extent that dry insecticides or other suitable materials were carried by airplane in a container within the airplane body and dropped from the bottom of the hopper, or container, through a trap or sliding door, as desired, by the operator as the airplane traveled over the terrain to be treated.

The distribution of the materials deposited was enhanced by the use of a Venturi tube, which created an effective air stream of expanding volume so as to carry the particles as released in an expanding air current. The forward end of the Venturi tube was positioned to receive the air blast from the propeller slip stream and the rear enlarged opening of the Venturi tube extended along and below the body of the ship.

While apparatus of this nature was suitably adopted for dissemination of dry, powdered insecticides, it is not readily adapted to distribution of insecticides consisting of a semi-fluid or plastic mass such as those used to poison grasshoppers. This type of insecticide consists, in general, of a poison, a food substance as a carrier for the poison and a binder such as molasses, or the like. The mixture is compounded to have a plastic or semi-fluid consistency and when placed in the container or hopper of an airplane dissiminator required agitation in order to cause it to flow smoothly down in the sides of the hopper and out the releasing vent. For the purpose of securing agitation, oscillating or transverse rotary agitators have heretofore been used. However, it has been found that these are insufficient to accomplish a proper distribution and discharge of this type of insecticide, as continuous agitation caused the mixture to harden, lump up, and bridge over the discharge vent. Agitation should be applied in a minimum amount and then only when the substance is being discharged.

In view of the foregoing, the objects of this invention are:

First, to provide proper agitation of semi-solid insecticide mixtures within the container of an airplane for aerial dissemination;

Second, to provide an agitator for such uses with a driving means which is easy to operate and light in weight;

Third, to provide such an agitator with a means for controlling its operation so that it operates only at such times as are desirable for the proper agitation of masses of insecticide in order to secure their free flow through the hopper and out of the releasing vent when required;

Fourth, to provide an agitator for hoppers of insecticide distributing airplanes together with a driving means adapted to operate only while material is being discharged from the hopper.

Other objects will appear hereinafter.

I attain the foregoing objects by means of the devices illustrated in the accompanying drawing in which, Figure 1 is a side elevation of the central portion of an airplane body provided with a hopper having my improved devices attached thereto;

Figure 2 is an underside or belly view taken on line A—A of Fig. 1 and partially in section to more clearly illustrate certain operative parts and;

Figure 3 is a sectional view taken on line B—B, Figure 1, drawn on an enlarged scale.

Similar numerals refer to similar parts in the several views.

I have found that continuous agitation or kneading of a plastic or semi-fluid mass of insecticide is highly undesirable. If an agitator is applied to the hopper and permitted to operate continuously the material will ball up and harden to such an extent that it packs and bridges over and loses its fluidity. In this condition it can not flow down the hopper and out of the discharge opening. On the other hand if agitation be applied and maintained only during the period that the hopper discharge gate is open the material will not ball up or harden because it is in fluid movement. When not discharging it should be left quiescent. Since the operator of the dissiminating plane has his attention absorbed by the operation of the plane and discharge lever, it is imperative that the operation of the agitator be made automatic and controlled in conjunction with the operation of the discharge door.

Referring to the drawing, 2 refers to the body of the plane; 3 to the hopper generally. At the bottom of the hopper there is a sliding gate 4 controlled by two longitudinally extending operating links 5 on either side which connect with a control lever in the operator's cockpit positioned within the plane body and to the rear of the hopper. The rearward motion of these bars opens the sliding gate and permits material within the hopper to drop through opening 6 and into the air stream 7 through the Venturi tube 8. Positioned slightly above this opening of the hopper is a laterally extending shaft 10 journalled in each of the lateral sides of the hopper. The middle of this constitutes a rotary agitator and is provided with fingers 11 extending transversely through the shaft.

The left end of shaft 10 carries a spur gear 12 which meshes with a similar gear 13 carried on a transverse shaft 15 parallel to shaft 10 and journaled so as to be above and slightly forward of it. Gear 16 is, in turn, driven by gear 14, and this is similarly positioned on shaft 17 above and to the rear of shaft 10. Shafts 15 and 17 each carry transverse pins 20 to act as agitators. Shaft 10 turns counterclockwise; shaft 15 clockwise, and 17 counterclockwise. The combined effect of the agitators carried on these shafts is to draw the insecticide downward and forward and out through the forward edge of discharge slot 6.

Shaft 10 is driven through coupling 21 by a shaft 22 extending at right angles from the cylindrical propeller housing 23 which is attached to the side of the plane body by brackets 24.

A propeller 25 to be driven by the slip stream is supported on shaft 26 at the forward end of housing 23. This shaft extends axially through the housing 23 and its motion is transmitted to shafts 22 and 10 by speed reducing gearing 27. This may be either bevel gearing, as shown, or any other conventional type of reduction gearing when greater reducing ratios are required. The speed at which the agitating shafts turn depends on the consistence of the insecticide mixture, usually a speed of 200 R. P. M. has been found best.

Just behind the propeller 25 and on shaft 26 there is a brake drum 30. A brake band 31 extends around this drum and is provided with suitable links 32 and a lever arm 33 for its actuation. Attached to the outer end of the lever 33 is a cable 34 which extends inwardly toward the middle of the plane body over a pulley 35 and thence rearwardly to connect with a pivot arm 36 pivotally attached to the under part of the body 2. This arm is pivoted by pin 37 proportioned so that its free end 38 contacts the forward edge of the sliding door 4 when it is in forward or closed position. In this position arm 36 is moved to the position shown by the solid lines and a sufficient pull is exerted on the cable 34 to actuate and set brake band 31 and thus stop rotation of shaft 26. In order to make this pull somewhat resilient a closed coil spring 39 is included within the transverse span of the pull cable 34. A tension spring 40 urges free end 38 of lever arm 33 in contact with the forward edge of gate 4. When this gate is moved to open or discharging position the lever arm 36 moves to the position indicated by the dotted lines 36*a*.

Tension on cable 34 is then relieved and brake band 31 opens and releases drum 30, whereupon shaft 26 is free to turn and drive the agitator shafts. When gate 4 is closed agitation automatically stops as above explained.

I have found that by using this device even the heaviest mixtures of insecticide can be consistently spread without clogging.

In use the hopper 9 is filled with insecticide—plastic or powdered as the case may be—through lid 42. The plane operator releases this material by operating the usual release lever in the cockpit (not shown) which is coupled to links 5 and opens door or gate 4. The opening motion of this gate is transmitted by lever arm 36 moving to position 36*a*, as indicated by the dotted outline, as above explained, to the lever 33 to release the brake drum 30 and permit propeller 25 to drive the several agitator shafts. Closing the gate stops the agitators and the material is left in a quiescent state until discharge is again needed. Packing, bridging and balling up is thus avoided, while there is adequate agitation to feed material through the hopper gate when needed.

To those familiar with the art various changes and modifications may be suggested, therefore, I wish to be limited only by the following claims.

I claim:

1. In combination with an airplane having a hopper, a hopper discharge gate and connecting means for operating said gate from the plane cockpit, a plurality of agitators operative in the lower portion of said hopper, a driving means for said agitators including an air operated propeller mounted on a driving shaft, a brake mechanism associated with said shaft, a pivoted arm having one of its ends in contact with said hopper gate, and a pull cord connecting the opposite end of said pivoted arm with said brake to set said brake when the gate is closed and to release said brake when the gate is opened.

2. In aerial apparatus for dissemination of insecticide or the like, in combination, a hopper, an agitator operative therein, a discharge outlet in the bottom of the hopper, a movable gate for controlling the discharge of the insecticide through the outlet of the hopper, a drive shaft for said agitator, a brake mechanism connected to said drive shaft, and connecting means between said gate and said brake to control the setting and the releasing movements of said brake in accordance with the closing and opening movements respectively of said gate.

3. In aerial apparatus for disseminating an insecticide or the like, in combination, an airplane having a hopper, a discharge outlet in the lower end of said hopper, a slidable gate for controlling the discharge of the insecticide through said discharge outlet, a plurality of agitators within the hopper, an air driven power shaft, a drive connection between the shaft and the agitators for actuating said agitators when said shaft is operated, a brake for the power shaft, a pivoted arm actuated by the opening and closing movements of the gate, and a linkage connection between said arm and said brake to control the operation of the power shaft in accordance with the opening and closing movements of the slidable gate.

4. In aerial apparatus for disseminating an insecticide or the like, in combination, an airplane having a hopper, a discharge outlet in the lower end of said hopper, a slidable gate for controlling the discharge of the insecticide through said discharge outlet, a plurality of agitators within the hopper, an air driven power shaft, a drive connection between the shaft and the agitators for actuating said agitators when said shaft is operated, braking means operative on said power shaft and a pivotally mounted arm contacting at an end with the slidable gate to follow the opening and closing movements of said gate and connected by linkage at its opposite end to said brake for setting said brake when the slidable gate is in closed position and to release the brake when said gate is in open position.

GEORGE CURTIS QUICK.